United States Patent

[11] 3,594,102

[72] Inventor William A. Oden
 Temple City, Calif.
[21] Appl. No. 848,829
[22] Filed Aug. 11, 1969
[45] Patented July 20, 1971
[73] Assignee Domain Industries, Inc.
 New Richmond, Wis.

[54] WATER PUMP IMPELLER HAVING ELECTRICAL INSULATION AND CORROSION-PREVENTATIVE FEATURES
4 Claims, 3 Drawing Figs.
[52] U.S. Cl. .................................................. 417/423,
 277/96
[51] Int. Cl. ...................................................... F04b 35/04,
 F16j 15/54
[50] Field of Search .......................................... 103/103,
 114; 417/423; 277/96 X

[56] References Cited
UNITED STATES PATENTS
2,759,428 8/1956 Kirby .......................... 103/103
2,764,099 9/1956 Wernert ....................... 103/114 X
3,003,424 10/1961 Prasse .......................... 103/103 (M)
3,168,868 2/1965 Schulty ......................... 103/87
3,264,999 8/1966 Tutthill ......................... 103/87
3,304,875 2/1967 Copeland ..................... 103/87

Primary Examiner—Leonard H. Gerin
Attorneys—Williamson, Palmatier & Bains, George F. Williamson, H. Dale Palmatier and Herman H. Bains ABSTRACT: An impeller for rotary water pumps and the like which through the provision of novel components and combinative relations with the driving shaft of an electric motor, inherently accomplishes two important new results, to wit:
1. The housing of the pump and all water passing therethrough are dielectrically insulated from the metal driving element of the motor.
2. The motor shaft, from its terminal point to an area outside of the pump housing, is entirely enclosed within a protruding sleeve carried by the impeller, thus preventing accumulation of rust or other corrosion as well as eliminating electrolytic buildup on the motor shaft.

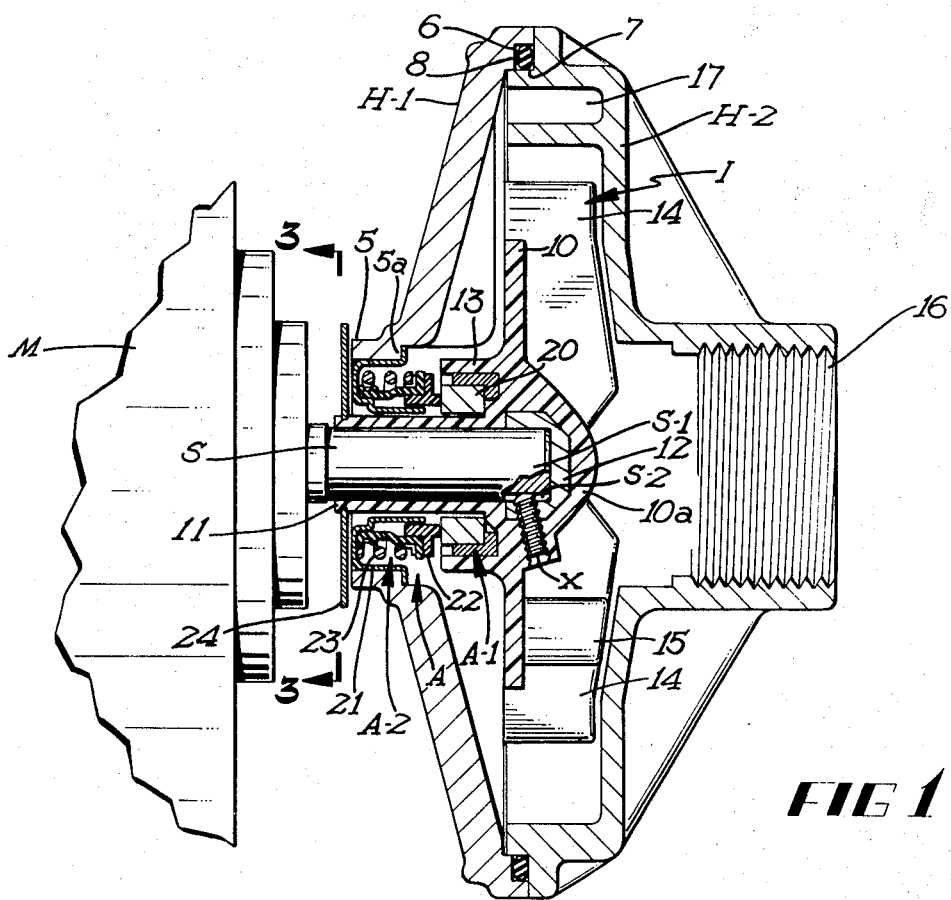
FIG 1
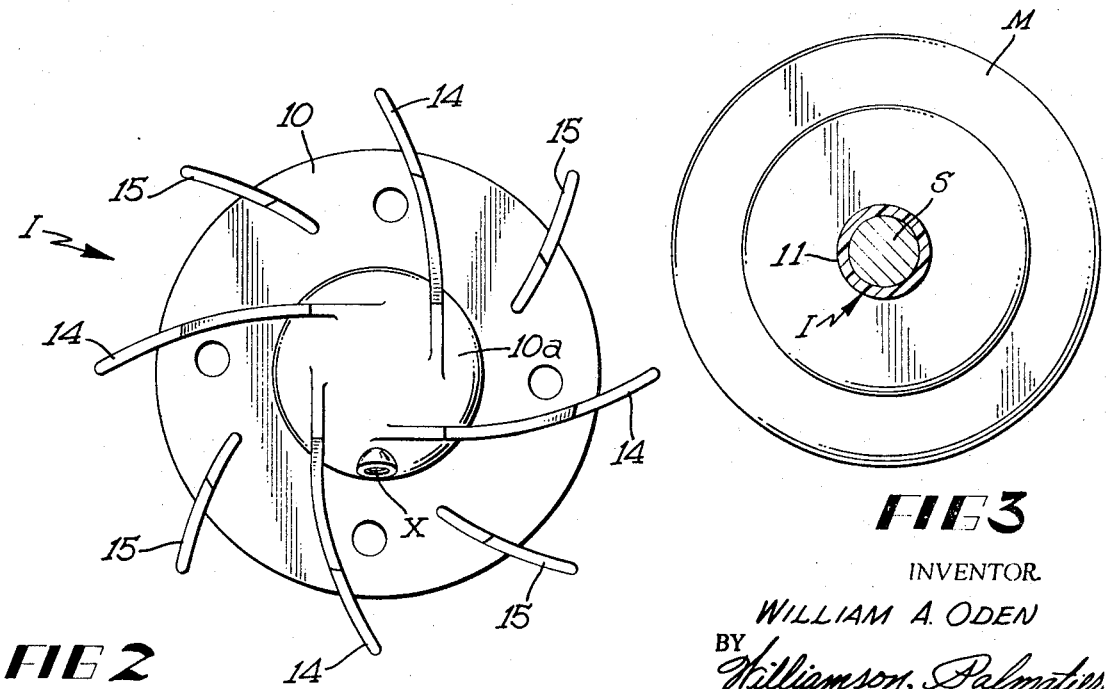
FIG 2
FIG 3
INVENTOR.
WILLIAM A. ODEN
BY Williamson, Palmatier
& Bains
ATTORNEYS

WATER PUMP IMPELLER HAVING ELECTRICAL INSULATION AND CORROSION-PREVENTATIVE FEATURES

The invention is characterized by the combination with a water pump housing which has a generally central liquid chamber, an intake, a discharge, and an axial sleeve at one end for accommodation of the rotary driving or motor shaft as well as the mechanical annular seal assembly, of the novel rotary impeller with its blades mounted in the liquid chamber and with a back bodyplate having a rigid axial portion constructed wholly of electrical insulating material. Preferably the entire backplate and impeller are constructed of electrical insulating material. The axial portion has rigidly connected thereto and sealed therewith (preferably integrally formed) a rearwardly protruding coaxial protective sleeve constructed also of electrical insulating material. This sleeve snugly surrounds the end of the driving shaft.

This invention relates generally to rotary impellers employed in combination with the housing of conventional types of water pumps, and which have provision for accommodating the projecting end of the driving or armature shaft of an electric motor, and in addition, provide for retaining and accommodating a mechanical sealing assembly interposed between the motor driving shaft and a flange or sleeve provided by the rear end of the pump housing.

In the prior art, water pumps of the class described directly driven and interconnected with the driving shaft of an electrical motor, are extensively used for a variety of purposes including numerous uses where the water discharged from the pump engages the person of a human being, such as in supply to swimming pools, household water systems, lavatories and the like. In motor-driven water pumps of such types, there has been almost universally the critical danger of electrical currents being transmitted from the metal driving shaft of the motor to the impeller or housing of the pump structure, and then to the water or other conductive liquid which is forced through the pump and its discharge.

Furthermore, in water pump structures of the class described, the prior art to my knowledge has made no provision for preventing slight seepage of water or conductive liquid between the mechanical seal assembly and the outer portion of the motor shaft which passes therethrough. Thus, rust and other corrosion as well as accumulation of materials through electrolytic action, has often in extended use of the water pump caused the motor shaft and the mechanical seal to become interlocked.

It is an object of my present invention to provide in conventional water pump housing with a water chamber and intake (usually axial), and with an axial sleeve at one end of the housing for accommodating the motor driving shaft and an annular seal assembly, a novel and improved rotary impeller which employs certain new components closely cooperating with parts of a conventional pump housing to dielectrically insulate the metal motor driving shaft from the housing and impeller of the pump, and from the water or other electrical conductive liquid passing through the pump.

A further object is to provide a pump impeller which through its inherent components, provides a protective seal completely surrounding and encasing the extremity of the motor driving shaft and portions extending into the pump housing, thereby positively eliminating contact of the motor shaft with any water or other conductive material and preventing accumulation of rust or other corrosion as well as collection of any material which might result from an electrolytic action upon the motor shaft or upon the seal assembly which surrounds the shaft.

More specifically, it is an object of my invention to provide in combination with a water pump housing of the type having a central water chamber and an intake and discharge, as well as an axial sleeve or the like at one end for receiving and accommodating the driving shaft of the motor together with a mechanical seal assembly, a closely cooperating, novel rotary impeller which in addition to a body or backplate and blades, rigidly carries and preferably has formed integral therewith, a closed socket in the form of a sleeve closed at its inner end and constructed of electrical insulating material and dimensioned to snugly fit the projecting outer end of the motor driving shaft, wholly enclosing the same. The structure of the rotary impeller further, at the inner end of the sleeve where the axial portion of the backplate of the impeller is integrally constructed of electrical insulating material, contains a driven element for positive driving connection with the terminal portion of the motor shaft.

The foregoing and other objects of the invention will be more apparent from the following description made in conjunction with the accompanying drawings, wherein like reference characters refer to similar parts throughout the several views and in which:

FIG. 1 is a horizontal cross section taken axially through the rather conventional type of water pump housing, with an embodiment of my impeller invention operatively employed and drivably connected with the projecting driving shaft of an electrical motor;

FIG. 2 is a front elevation or front plan view of the impeller detached, some portions being broken away to disclose certain elements disposed rearwardly of the axial portion of the impeller;

FIG. 3 is a cross section looking in the direction of the arrows taken on the line 3–3 of FIG. 1.

In the embodiment of the invention illustrated, my novel impeller and related components are shown, operatively employed in the housing of conventional structure for a water pump which comprises a pair of interconnected and opposed frustoconical housing sections H–1 and H–2, sealed and secured together along their peripheral edges. The rear section H–1 of the pump housing is provided with a concentric axial sleeve 5 of conventional structure, having an internal angular shoulder 5a which assists in retaining a conventional annular sealing assembly A, which in structures of the prior art, directly surrounds the driving shaft S of the electrical motor M.

It will be understood that in this structure, the motor driving shaft S at its projecting end, is accommodated in the recessed portion of the housing sleeve 5, disposed coaxially thereof and of course, coaxially with the impeller which is employed in combination with the pump housing and its intake and discharge structure.

Referring again to the housing sections H–1 and H–2, adjacent their circular peripheral edges, they are provided with a groove 6, shoulder 7 respectively, for receiving and clamping against a large sealing ring or gasket 8. The two housing sections H–1 and H–2 are clamped together about the sealing ring 8, by suitable clamping bolts or other means, not shown.

My impeller, indicated as an entirety by the letter I is preferably, but not necessarily, integrally constructed with all its components and related parts, from hard dielectric or electrical insulating material such as for example, polycarbonate. The entire impeller structure may be injection molded from suitable plastic material such as polycarbonate. A specific example of suitable polycarbonate material which resists wear, has high tensile strength and suitable rigidity and resistance to fracture or splitting, is the material known as "Lexan" supplied by General Electric Company.

In the form shown, my impeller comprises a substantially rigid, circular backplate 10, provided with a preferably integral reinforced axial and forwardly indented portion 10a, which if molded integrally with the backplate 10 is thickened in structure.

Projecting and protruding rearwardly and axially from the eye portion 10a is a preferably integrally formed, protective cylindrical sleeve 11 which must, of necessity, as well as the portion 10a, be constructed of substantially hard, smooth electrical insulating material. Sleeve 11 is rigidly secured (preferably integrally formed) with axial backplate portion 10a and is internally dimensioned to smoothly and snugly telescope with and surround the motor driving shaft S, enclosing the drive connection end S-1 of said shaft.

In the injection or other fabrication of the socket formed by the inner end of protective tube 11 and the concave portion 10a of the eye of impeller back disc 10, an internal, shaped drive connector element, such as a metal insert thimble 12, is positively affixed as by embedding in the plastic material of eye 10a and sleeve 11, and internally and snugly interfits with the end S-1 of motor shaft S. In the form shown in FIG. 1 of the drawings, the drive connection end S-1 of the motor is provided with a longitudinal spline S-2. A diagonally disposed setscrew X is threaded to a tapped opening in the insert thimble 12 and its inner end engages and is locked in the spline S-2. After insertion of the setscrew X, plastic sealing material covers the head and tapped aperture in the portion 10a of the impeller through which the setscrew is applied.

It will of course be understood that the insert thimble 12 may be otherwise drivably connected to the end S-1 of motor shaft S, such as by being formed with internal threads which engage with external threads provided by the extremity of the motor shaft.

In the preferred form, an annular flange 13 (preferably integrally formed with the backplate 10 of the impeller), constructed of hard electrical insulation material, is positively affixed to the rear face of back disc 10 and disposed in spaced relationship concentric of the protective sleeve 11. This annular flange 13 is adapted to receive and frictionally retain the forward cylindrical portion of a mechanical seal assembly which preferably is provided with an annulus A-1 constructed of electrical insulating material. The sealing unit A-1, which includes the external annulus, has affixed thereto an annular sealing element 20 of a composition to form an efficient seal and which is very slightly compressible, said part 20 extending rearwardly a slight distance beyond the forward edge of the annulus A-1 for contact with a cooperating sealing element, later to be described.

The sealing assembly utilized, which is of conventional structure, includes a second sealing unit A-2 for retention internally in the rear annular sleeve 5 and with the assistance of the shoulder 5a of said sleeve. The unit A-2 comprises a light metal generally annular shell member 21 and a spring-pressed ring 22 constructed of electrical heat-insulating material with a coil spring 23 interposed between the annulus 21 and the ring 22 urging the ring at its inner planar bearing surface into firm contact with the element 20 carried by the opposing sealing unit A-1. The interior surfaces of units A-1 and A-2 are spaced slightly outwardly of the protective sleeve 11.

On the front face of the circular impeller backplate 10, impeller blades 14 and 15 are, as shown, successively formed, preferably being integrally molded from the material of backplate 10, and protruding forwardly from the backplate, shaped in substantial radial and longitudinal configuration for closely clearing the interior of the forward housing section H-2.

The backplate 10 and impeller blades 14 and 15 revolve in the main liquid chamber, designated by the letter C, within the pump housing. Housing section H-2 has an axial intake 16.

While the blade formation and arrangement of my impeller may take a wide variety of forms, in the particular embodiment illustrated in FIG. 2 of the drawings the longer impeller blades 14 have their inner ends extending inwardly slightly beyond the cross-sectional area of the fan intake 16, while the shorter blades 15, at their inner ends, terminate a spaced distance from the impeller backing plate proper. The tips of blades 14 and 15 are disposed in close working clearance to the main internal circumference of the water chamber C mainly defined by the housing section H-2. In conventional fashion a tangential and centrifugal discharge passage 17 is defined by the configuration and structure of the housing section H-2.

If desired, a disc 24, constructed preferably of dielectric material, may be affixed to the outer end portion of protective sleeve 11 and of course will revolve therewith to further exclude dust and prevent any slight seepage of water from contact with the inner portion of shaft S, thus further preventing corrosion.

Operation

It is assumed that the motor M and the pump housing formed by the housing sections H-1 and H-2 are rigidly affixed to and mounted upon suitable mounting structure with the shaft S of electric motor M disposed coaxially with the heavy metal sleeve 5 of housing section H-1.

In assembling the pump structure, housing section H-2 is separated from housing section H-1 and the novel impeller I is then axially inserted, carrying in the socket formed by the inner end of protective sleeve 11 and the concave portion 10a of the impeller I, the internally squared or polygonal cross section drive connection element 12. The protective sleeve 11 snugly embraces and may be driven upon the projecting motor shaft portion S and the impeller is turned until proper nonrotative seating of the driving end S-1 of the motor shaft with the thimble element 12 is obtained. In such position the protective sleeve and also shaft S extend normal or in perpendicular relation to the back disc or plate 10 of the impeller, and the open end of protective sleeve 11 projects preferably some little distance beyond the external end of the heavy axial sleeve 5 carried by the housing section H-1.

The two units A-1 and A-2 of the mechanical sealing assembly A are preferably respectively seated and retained in the dielectric annular flange 13 of the impeller and internally in the sleeve 5 and in engagement with the shoulder 5a of the housing member H-1. In proper seated position, the opposing edges of the seal member 20 and the dielectric seal member 22 are in contact.

It will be seen that the entire projecting portion of the motor drive shaft S is covered and enclosed by the protective sleeve 11 and its rigid affixation and sealing with the concave surface or eye portion 10 of the impeller. Since the materials or substance of said sleeve and eye portion and axial portion 10a of the impeller are by the requirements of this invention constructed of dielectric or high-quality electrical insulating material, it is not possible for electromotive forces or currents to pass from the steel or other motor driving shaft S to any parts of the housing of the pump structure, or to in any way be conducted to the water or other electric conductive liquid which passes through the pump or its central liquid chamber C.

Therefore the housing of the pump structure, as well as the contents of all water or conductive liquid passing through the pump, are dielectrically insulated from all electromotive forces or electric current.

Furthermore, it will be seen that no water from the central chamber C may leak through or be received by the external periphery or any portion thereof of the driving extension S of the motor shaft. This positively prevents any electrolytic action from taking place upon the external periphery of driving shaft S, as well as the production of corrosion or rust upon said shaft.

It is further pointed out that the sealing assembly comprising the units A-1 and A-2 are electrically insulated as to all of their parts by means of the seal-retaining flange 13, which concentrically is spaced from the protective sleeve 11.

From the foregoing description it will be seen that I have not only provided a new combination of impeller, components and pump structure for overcoming serious and dangerous characteristics of the prior art; but I have further provided an inherent and preferably integral impeller structure which may be readily employed with many types of motor-driven pump housings now in use to produce highly desirable new results.

The construction of my unique impeller with its added components lends itself to very economical manufacture in integral form by injection molding of hard plastic material such as polycarbonate.

What I claim is:

1. In use with a liquid pump housing having a generally central liquid chamber, an intake, a discharge, and an axial bore at one end for accommodating a rotary driving shaft and a mechanical annular seal assembly, a rotary impeller having blades mounted in said liquid chamber and having a back bodyplate provided with a rigid axial portion constructed wholly of electrical insulating material, said axial portion having rigidly connected thereto and sealed therewith a rearwardly protruding, coaxial protective sleeve constructed also of electrical insulating material, said sleeve snugly surrounding the end of said driving shaft throughout said bore and having adjacent its inner end and in conjunction with said rigid axial portion, means for drive connection of the end of said driving shaft with said impeller.

2. The structure set forth in claim 1 wherein,
said axial portion of said bodyplate and said sleeve are integrally constructed of a hard plastic material having electrical insulating properties.

3. The structure and combination set forth in claim 1 wherein, said axial portion also has rigidly connected thereto and sealed therewith a rearwardly protruding annular seal-receiving flange, constructed also of electrical insulating material, extending coaxial with said protective sleeve but of substantially less length, said sleeve having an internal cylindrical surface and said mechanical seal assembly at its forward portion being held and disposed beneath said annular flange.

4. The structure and combination set forth in preceding claim 3 wherein, said back bodyplate, said axial portion, said sleeve and said annular flange are all integrally constructed of electrical insulating material.